US007809720B2

(12) United States Patent
Aggarwal et al.

(10) Patent No.: US 7,809,720 B2
(45) Date of Patent: Oct. 5, 2010

(54) OPTIMIZATION-BASED DATA CONTENT DETERMINATION

(75) Inventors: Vikram Aggarwal, Ossining, NY (US); Michelle X. Zhou, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 11/763,132

(22) Filed: Jun. 14, 2007

(65) Prior Publication Data
US 2007/0239670 A1    Oct. 11, 2007

Related U.S. Application Data

(63) Continuation of application No. 10/969,581, filed on Oct. 20, 2004, now abandoned.

(51) Int. Cl.
*G06F 7/00* (2006.01)
*G06F 17/30* (2006.01)
(52) U.S. Cl. .................. 707/724; 707/725; 707/946
(58) Field of Classification Search ............. 707/723, 707/724, 725, 946, 999.102, 999.104, 999.107
See application file for complete search history.

(56) References Cited

U.S. PATENT DOCUMENTS

| | | | | |
|---|---|---|---|---|
| 5,428,735 | A | * | 6/1995 | Kahl et al. ................. 715/839 |
| 5,577,241 | A | * | 11/1996 | Spencer ........................ 707/5 |
| 5,886,698 | A | | 3/1999 | Sciammarella et al. |
| 5,913,205 | A | | 6/1999 | Jain et al. |
| 5,983,216 | A | | 11/1999 | Kirsch et al. |
| 6,012,053 | A | | 1/2000 | Pant et al. |
| 6,035,339 | A | * | 3/2000 | Agraharam et al. ......... 709/246 |
| 6,067,552 | A | * | 5/2000 | Yu .............................. 715/234 |
| 6,240,448 | B1 | * | 5/2001 | Imielinski et al. ........... 709/218 |
| 6,247,050 | B1 | | 6/2001 | Tso et al. |
| 6,460,079 | B1 | | 10/2002 | Blumenau |
| 6,785,676 | B2 | * | 8/2004 | Oblinger ........................ 707/5 |
| 7,113,949 | B1 | * | 9/2006 | House et al. ................. 707/10 |
| 7,117,442 | B1 | | 10/2006 | Kemble et al. |

(Continued)

OTHER PUBLICATIONS

K. Houck, "Contextual Revision in Information Seeking Conversation Systems," ICSLP, 4 pages, 2004.

(Continued)

*Primary Examiner*—Luke S. Wassum
*Assistant Examiner*—Mariela D Reyes
(74) *Attorney, Agent, or Firm*—Anne V. Dougherty; Ryan, Mason & Lewis, LLP

(57) ABSTRACT

Improved data content determination techniques are disclosed for use in accordance with information-seeking systems. For example, in one illustrative aspect of the invention, a technique for determining data content for a response to a query comprises obtaining a user query, and dynamically determining data content suitable for generating a response to the query, wherein data content determination is modeled as an optimization operation which attempts to balance context-based selection constraints. Further, the step of dynamically determining data content may further comprise modeling the context-based selection constraints as feature-based metrics. The feature-based metrics may be formulated using contextual information. Still further, the step of dynamically determining data content may further comprise performing the optimization operation such that one or more desirability metrics are maximized and one or more cost metrics are minimized, thus balancing the various constraints.

20 Claims, 11 Drawing Sheets

U.S. PATENT DOCUMENTS

| | | |
|---|---|---|
| 2002/0105532 A1 | 8/2002 | Oblinger |
| 2002/0107842 A1 | 8/2002 | Biebesheimer et al. |
| 2003/0144994 A1 | 7/2003 | Wen et al. |
| 2003/0211856 A1* | 11/2003 | Zilliacus .................. 455/466 |
| 2006/0026152 A1 | 2/2006 | Zeng et al. |

OTHER PUBLICATIONS

S. Pan, "A Mulit-Layer Conversation Management Approach for Information Seeking Applications," ICMI, 4 pages, 2002.

J. Chai et al., "Context-Based Multimodal Input Understanding in Conversational Systems," Proceedings of the 4th IEEE International Conference on Multimodal Interfaces, ISCLP, 6 pages, 2004.

M. Zhou et al., "Automated Authoring of Coherent Multimedia Discourse in Conversation Systems," Proceedings of ACM MM '01, pp. 555-595, 2001.

H.P. Grice, "Logic and Conversation," Syntax and Semantics, vol. 3, Speech Acts, pp. 41-58, 1975.

* cited by examiner

FIG. 1

| | |
|---|---|
| U1 | *SPEECH*: SHOW HOUSES NEAR PHELPS MEMORIAL HOSPITAL |
| R1 | *SPEECH*: I FOUND 3 HOUSES NEAR PHELPS MEMORIAL HOSPITAL<br>*GRAPHICS*: DISPLAY |
| U2 | *SPEECH*: TELL ME MORE ABOUT IT<br>*GESTURE*: POINT TO THE HOUSE ON THE RIGHT |
| R2 | *SPEECH*: HERE ARE THE ATTRIBUTES OF THIS 6-BEDROOM HOME<br>*GRAPHICS*: DISPLAY |

MLS#2302472
Bathrm: 3.1
Bedrm: 4
Price: $845000
Tax: $15751
LotSize: 1.0ac
Size: 3000.0 sq.ft

MLS#2218155
Bathrm: 5.2
Bedrm: 6
Price: $2550000
Tax: $40261
LotSize: 0.92ac
Size: 7240.0 sq.ft

MLS#2212449
Bathrm: 5.0
Bedrm: 5
Price: $699000
Tax: $10700
LotSize: 0.44ac
Size: 4000.0 sq.ft Briarcliff Manor
Phelps Memorial Hospital
Tarrytown

Briarcliff Manor

MLS#2218155
Bathrm: 5.2
Bedrm: 6
Heat: HYDRO_AIR
A/C: CENTRAL AIR
Fuel: GAS
Year: 1997
Sewer: PUBLIC
Water: MUNICIPAL
Levels: 3
Siding: BRICK
Roof: ASPHALT
Style: COLONIAL

FIG. 12

| FEATURE | DEFINITION |
|---|---|
| *CONTENT QUALITY* | |
| OBJECTIVENESS | DEGREE OF OBJECTIVITY OF THE CONTAINED INFORMATION |
| *CONTENT QUANTITY* | |
| INFORMATIVENESS | THE AMOUNT OF INFORMATION CONTAINED |
| AVAILABILITY* | HOW WELL THE DIMENSION IS POPULATED IN A DATABASE |
| *CONTENT RELEVANCE* | |
| IMPORTANCE | NATURAL IMPORTANCE TO THE DOMAIN |
| I-RELEVANCE* | RELATION TO A USER'S INTERESTS |
| K-RELEVANCE* | RELATION TO A USER'S KNOWLEDGE |
| Q-RELEVANCE* | RELATION TO THE CURRENT QUERY |
| H-RELEVANCE* | RELATION TO THE INTERACTION HISTORY |
| DEPENDENCY | RELATIONS TO ANY OTHER DIMENSIONS |
| MEDIA-SUIT ABILITY* | RELATION TO THE FITNESS OF A MEDIUM |
| MEDIA-CAP ABILITY* | RELATION TO THE CAPABILITY OF A MEDIUM |
| *COST* | |
| SPACE-COST* | NUMBER OF PIXELS NEEDED TO DISPLAY THE DATA |
| TIME-COST* | NUMBER OF WORDS NEEDED TO SPEAK THE DATA |

* DYNAMICALLY COMPUTED

FIG. 13

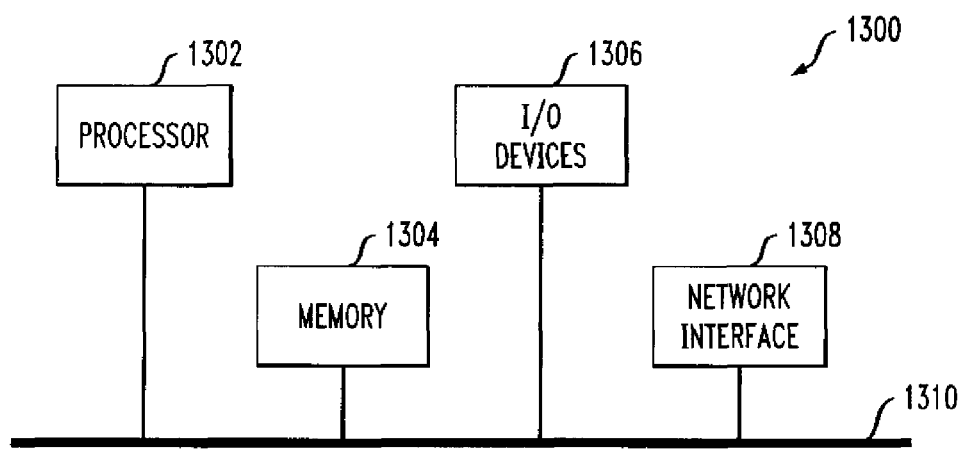

OPTIMIZATION-BASED DATA CONTENT DETERMINATION

CROSS-REFERENCE TO RELATED APPLICATION

This application is a continuation of U.S. application Ser. No. 10/969,581, filed on Oct. 20, 2004 now abandoned, the disclosure of which is incorporated by reference herein.

FIELD OF THE INVENTION

The present invention generally relates to information-seeking systems and, more particularly, to techniques for optimization-based data content determination in such information-seeking systems.

BACKGROUND OF INVENTION

Given a user data query to an information-seeking system, there may be multiple ways for the system to respond to such a query. Ideally, the response should be tailored to the user interaction context, including the query expression, the retrieval result, and user interests.

Since it is difficult to predict how a course of user interaction would unfold, it is impractical to plan all possible responses, including their content and form, in advance. Thus, researchers and practitioners have experimented with the concept of automating the generation of system responses. One key step in such an automation process is data content determination, a process that dynamically chooses data content in response to user queries.

Existing approaches use a rule-based or schema-based approach to determine response content or select content by specific factors, such as content importance, user knowledge, user preferences, or user tasks. However in reality, a wide variety of factors, including data result size, user interests, and available presentation budgets (e.g., screen real-estate), can impact the content determination simultaneously. Unfortunately, existing approaches do not have techniques for adequately handling these factors.

Accordingly, techniques are needed for providing improved data content determination in information-seeking systems.

SUMMARY OF THE INVENTION

The present invention provides improved data content determination techniques for use in accordance with information-seeking systems.

For example, in one illustrative aspect of the invention, a technique for determining data content for a response to a query comprises obtaining a user query, and dynamically determining data content suitable for generating a response to the query, wherein data content determination is modeled as an optimization operation which attempts to balance context-based selection constraints.

Further, the step of dynamically determining data content may further comprise modeling the context-based selection constraints as feature-based metrics. The feature-based metrics may measure a presentation desirability value and a cost value. The feature-based metrics may be formulated using contextual information. Such contextual information may comprise at least one of query information, a conversation history, and a user model.

Still further, the step of dynamically determining data content may further comprise performing the optimization operation such that one or more desirability metrics are maximized and one or more cost metrics are minimized, thus balancing the various constraints. By way of example, an optimization-based algorithm may attempt to maximize one or more desirability metrics while containing one or more costs. This may illustratively be implemented as follows. Given all possible content $A=\{c_1, \ldots, c_N\}$, the selected content $S=\{c_p, \ldots, c_q\}$ is a sub-set of A, such that a summation of desirability($c_i$) is maximized and a summation of cost($c_i$) is less than a presentation budget.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating a user query and system response for use in illustrating techniques of the present invention;

FIG. 12 is a diagram illustrating dimension features, according to one embodiment of the present invention; and FIG. 13 is a diagram illustrating a computer system suitable for implementing an information-seeking system, according to one embodiment of the present invention.

DETAILED DESCRIPTION OF PREFERRED EMBODIMENTS

It is to be understood that while the present invention will be described below in the context of exemplary information-seeking applications such as a real-estate application, the invention is not so limited. Rather, the invention is more generally applicable to any application in which it would be desirable to provide optimization-based content determination techniques.

As mentioned above, given a user data query to an information-seeking system, there may be a number of ways for the system to respond. In particular, the response preferably considers user interaction context, which includes the query expression, the retrieval result, and user interests. Referring initially to FIG. 1, a diagram illustrates a user query and system response for use in illustrating techniques of the present invention. It is assumed that the user query is made to a multi-modal information-seeking system which permits the user input to be in more than one modality and the system output to be in more than one modality. For example, the user query may be in the form of text, speech and/or gesture (see U1 and U2 in FIG. 1), while the system response is in the form of speech and graphics (see R1 and R2 in FIG. 1).

Assume that the information-seeking system runs a real-estate application that is designed to assist potential buyers in finding residential properties. As shown in FIG. 1, for example, the system may choose to convey house size and cost information, such as the number of bedrooms and price (as shown in FIG. 1). Moreover, according to the query expression, the system may include the location of the Phelps Memorial hospital to provide the spatial context for the houses.

As demonstrated by this example, the implemented information-seeking system must consider a number of factors at run time when performing the automated process of data content determination. Data content determination is a process that dynamically chooses data content in response to user queries. As previously mentioned, existing approaches do not adequately balance various factors at run time, including data result size, user interests, and available presentation budgets (e.g., screen real-estate), which can impact the content determination simultaneously. Here we use a set of concrete examples to describe how various factors may impact the content determination in a user interaction.

First, data volume (the size of the result set for a user query) impacts content selection.

Figure 2A:
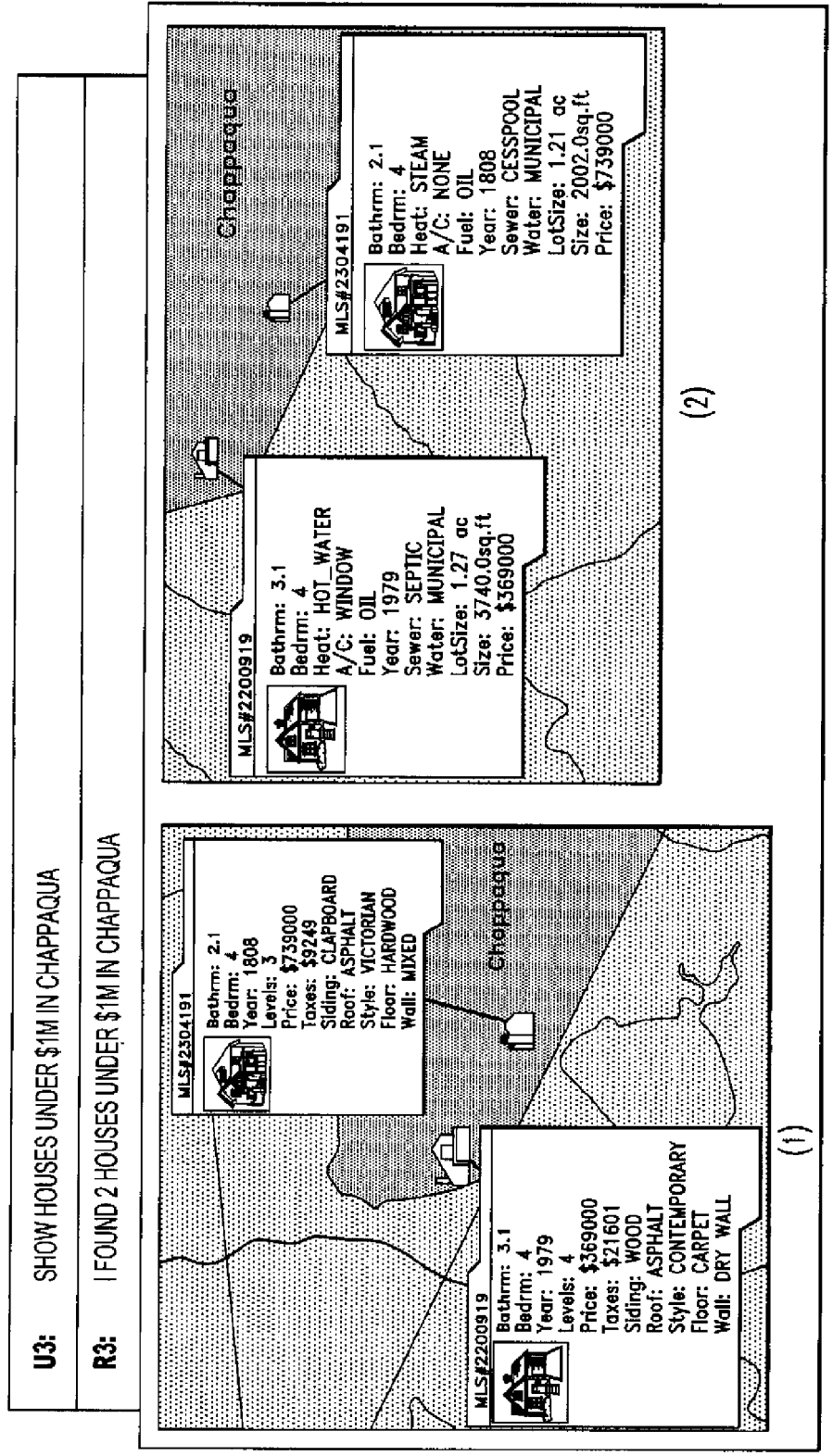
FIGS. 2A and 2B are diagrams illustrating samples of generated system response for different contexts for use in illustrating techniques of the present invention.
Figure 2B:
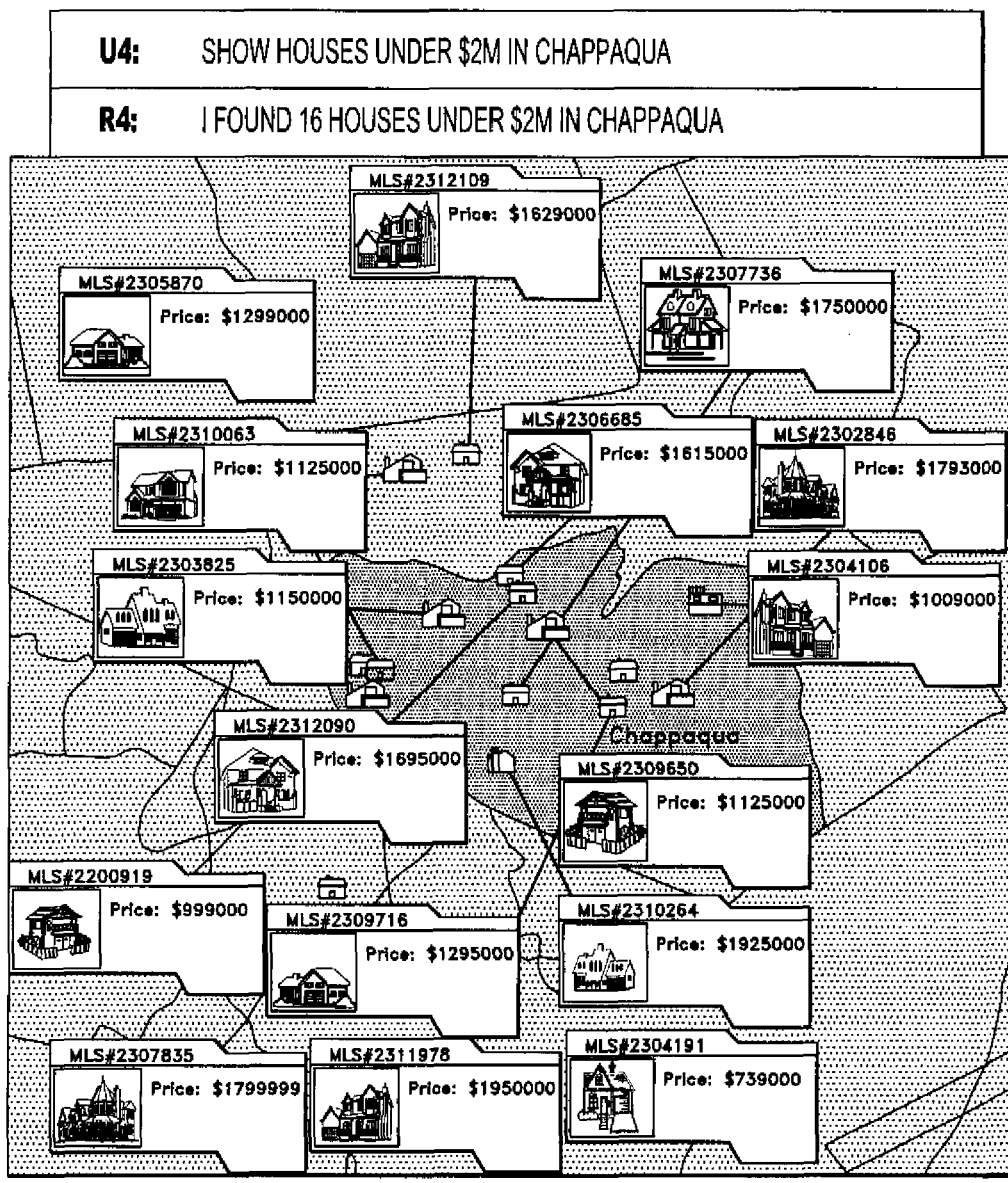

Normally, data volume is inversely proportional to the amount of information presented per instance due to resource limitations (e.g., screen real-estate). For example, FIGS. 2A and 2B are diagrams illustrating samples of generated system response for different contexts for use in illustrating techniques of the present invention. FIG. 2A-1 depicts a response associated with a user-specified preference with respect to financial, exterior and interior criteria, FIG. 2A-2 depicts a response associated with a user-specified preference with respect to size and amenity criteria, and FIG. 2B depicts a response associated with no specified preferences. As is evident, FIGS. 2A-1 and 2A-2 reveal more house attributes for two retrieved houses than FIG. 2B does for 16 houses.

Data properties influence what to convey. In FIGS. 2A and 2B, house locations are included due to their importance in the real-estate domain, and house images are selected for their ability of conveying rich information. Data properties dictate content selection when other factors are not present. In FIG. 2B, no user preferences are specified, and content is determined mainly by data properties, such as importance and informativeness (the amount of information being contained). In addition to individual data properties, data relations impact content selection. For example, it is preferable to present the number of bedrooms and bathrooms together. It is also desirable to convey house attributes (e.g., image) with a Multiple Listing Service (MLS) number to facilitate data identification (e.g., users may refer to the houses by their MLSs). However, it is undesirable to present MLS numbers alone, as they carry little information.

Response content should also be tailored to user interests. For example, for the same query the system conveys different data to suit different user interests. For one user who is interested in financial, exterior, and interior aspects, the system chooses data, such as tax, siding, and wall (FIG. 2A-1). For the other who cares for size and amenities, the system selects data, like lot size and heat (FIG. 2A-2).

User queries impact content selection, since they often imply interests of a user to which the responses should be tailored. In FIG. 1, query U1 may imply that the user is interested in the relationships between the houses and the hospital. Accordingly, the system responds by incorporating the relevant hospital information (i.e., location of the Phelps Memorial hospital).

Conversation history also influences content selection. "Conversation" generally refers to a sequence of queries and responses between a user and the system. As shown in FIG. 1, query U2 follows up query U1. Based on the conversation history, in this case, the system introduces new content (e.g., year), while keeping the important content to maintain the response continuity (e.g., showing house locations and bedrooms).

Thus, when determining data content for a user query, a number of factors should be considered including data properties and user interests. Generally, any subtle variations in these factors, such as changes in data volume or query patterns, may require different content sets to be selected, which in turn prompt different responses. To handle all the situations described above and all their possible variations, it is impractical to use a rule-based or plan-based approach, which would require an exhaustive set of selection rules or plans. Accordingly, the present invention provides an optimization-based framework that can dynamically decide content based on an interaction context, such as the specific user interests and given presentation resources. In addition, the invention attempts to select the most desirable content by balancing a wide variety of constraints in context.

As will be explained in detail herein, the present invention provides a framework, system, and methods for providing context-sensitive, extensible components employing dynamic data content determination. Thus, in one illustrative aspect, the invention comprises an intelligent, context-sensitive information-seeking system that can generate responses tailored to user interaction situation using a dynamic content determination module. In another illustrative aspect, the invention provides a general framework that models the content selection as an optimization problem, and context as constraints, and dynamically determines the most suitable content by balancing all constraints, including content organization (e.g., data grouping) and media allocation constraints (e.g., usage of suitable media) simultaneously. In a further illustrative aspect, the invention provides methods for representing and modeling selection constraints as extensible, feature-based metrics using a wide variety of contextual information, such as query information, conversation history, and a user model. In yet another illustrative aspect, the invention provides optimization-based algorithms for balancing all the selection constraints simultaneously.

Figure 3:
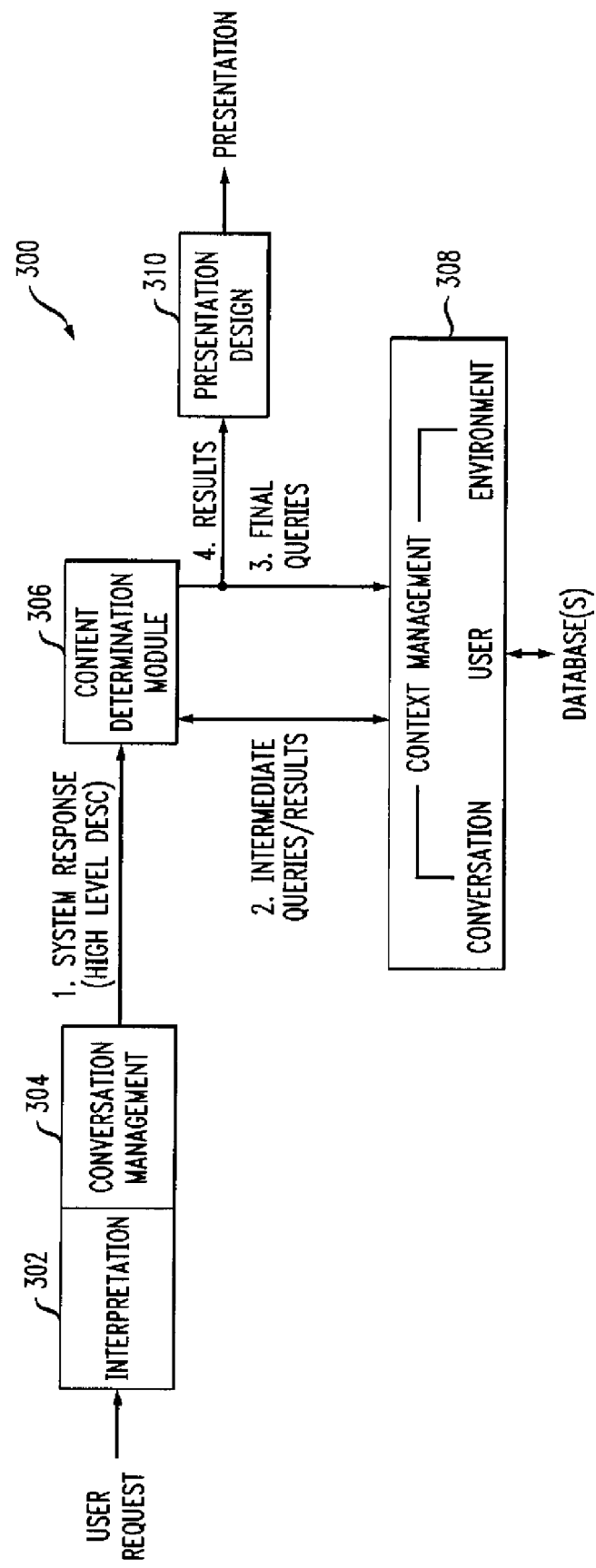
FIG. 3 is a diagram illustrating an intelligent information-seeking system employing a content determination component, according to one embodiment of the present invention.

Referring now to FIG. 3, a diagram illustrates an intelligent information-seeking system employing a content determination component, according to one embodiment of the present invention. It is to be appreciated that such a system may also be referred to as a "conversation system" since, as mentioned above, a sequence of queries and responses between a user and the system may generally be referred to as a conversation.

As shown, information-seeking system 300 comprises interpretation module 302, conversation management module 304, content determination module 306, context management module 308 and presentation design module 310.

While the invention is not limited thereto, in one embodiment, techniques described in K. Houck, "Contextual Revision in Information-Seeking Conversation Systems," ICSLP 2004, and/or in J. Chai et al., "Context-based Multimodal Input Understanding in Conversation Systems," the disclosures of which are incorporated by reference herein, may be used by interpretation module 302. Further, in one embodiment, techniques described in S. Pan, "A Multi-layer Conversation Management Approach for Information-Seeking Applications," ISCLP 2004, the disclosure of which is incorporated by reference herein, may be used by conversation management module 304. Also, in one embodiment, techniques described in the above-referenced J. Chai et al., "Context-based Multimodal Input Understanding in Conversation Systems" article may be used by context management module 308. Still further, in one embodiment, techniques described in M. Zhou et al., "Automated Authoring of Coherent Multimedia Discourse in Conversation Systems" ACM MM 2001, the disclosure of which is incorporated by reference herein, may be used by presentation design module 310.

The input to system 300 is a user request, given in one or more forms (e.g., through a graphical user interface or by speech and gesture). Given such a request, interpretation module 302 is employed to understand the meaning of the request. An interpretation result captures both the intention and attention of the request. In FIG. 1, the interpretation of U1 is to seek (intention) a set of houses satisfying a spatial constraint (attention). Based on the interpretation result, conversation management module 304 decides the suitable system actions at a high level. Depending on the context, it may decide to honor the user request directly by presenting the requested data or it may choose to ask the user additional questions.

Since a high-level system act does not describe the exact content (e.g., specific house attributes) to be presented, it is then sent to content determination module 306 to be refined (step 1).

When deciding the proper data content of a response, content determination module 306 does at least one of the following: (a) selects the proper sub-set of attributes to present; and (b) enriches existing queries to obtain all relevant information (e.g., to answer U1 in FIG. 1, formulating a query to retrieve the relevant hospital data). To make these decisions, the module may issue intermediate queries (step 2) to obtain necessary context information (e.g., querying the size of the result set or the data availability). This is provided by context management module 308.

Context management module 308 records various types of contextual information that may be used for making various decisions. Module 308 includes three types of information: conversation information, user information, and the environment information. This information may be stored in one or more databases. The conversation information records the sequences of user requests and the computer responses. The user information includes user preferences and interests. The environment information includes the information about the system environment, e.g., what type of display is used.

After the content is determined, final data queries are formulated (step 3) and data results are retrieved from the underlying databases. Such data results are then sent to a presentation design module 310 (step 4) to be presented. In addition, as mentioned above, such an integrated system maintains various contextual information about the conversation, the user (e.g., user interests), and the environment (e.g., what display is in use).

Figure 4:
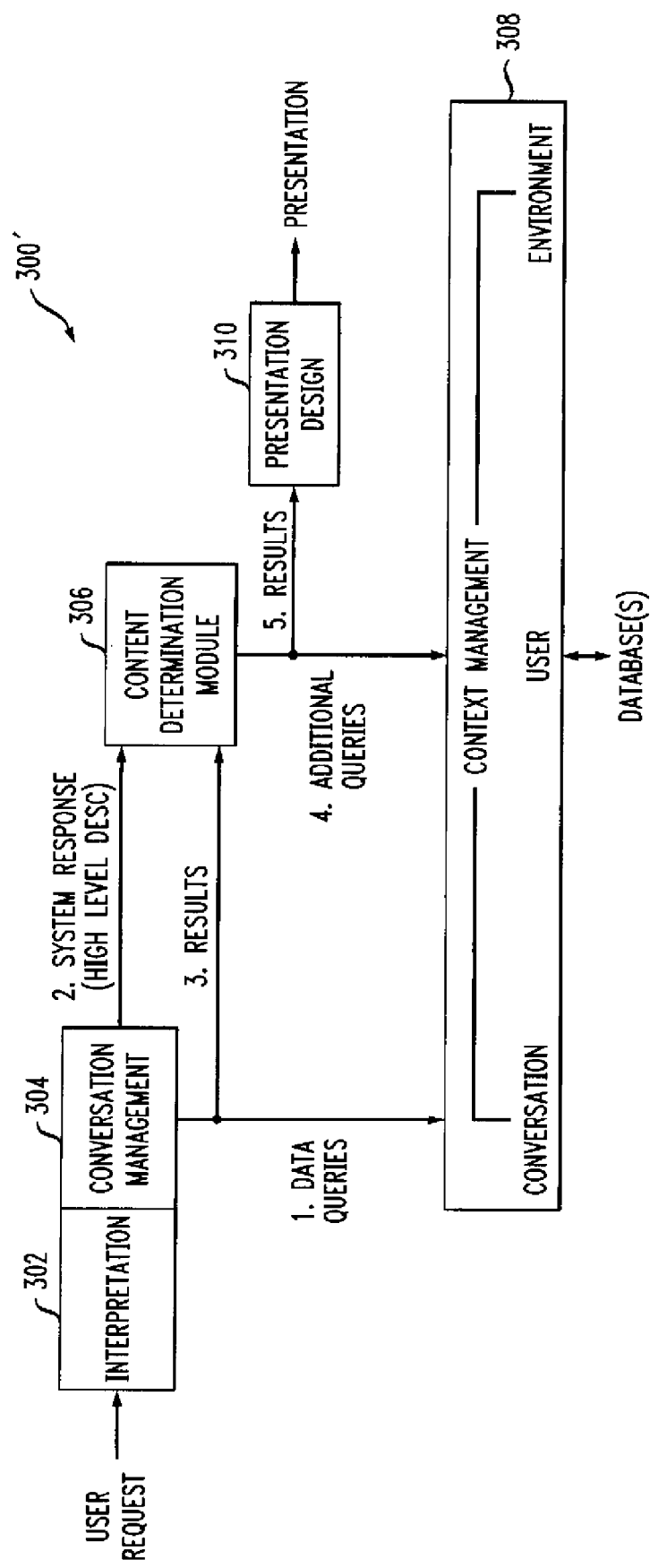
FIG. 4 is a diagram illustrating an intelligent information-seeking system employing a content determination component, according to another embodiment of the present invention.

It is to be appreciated that content determination deals with a data query specification, regardless when the query is actually executed. For example, FIG. 4 shows a slightly different example embodiment of such an intelligent information-seeking system, denoted as system 300', where data queries may be executed at different points in the pipeline. In this embodiment, at step 1, the data queries are given by a user input. In step 2, the conversation manager (module 304) determines a system response. Such response is a high-level description, such as "Describe Houses" without elaborating on what house attributes to describe and how to describe the houses attributes. Based on this description, at step 3, the system retrieves the user-requested data (e.g., houses) from underlying databases. The retrieved data is then sent to the module 306 (content determination module). Module 306 may formulate additional queries to retrieve more relevant data (e.g., hospitals related to the requested house data). Finally, in step 5, all the retrieved data is sent to module 310 for final presentation.

Figure 5:
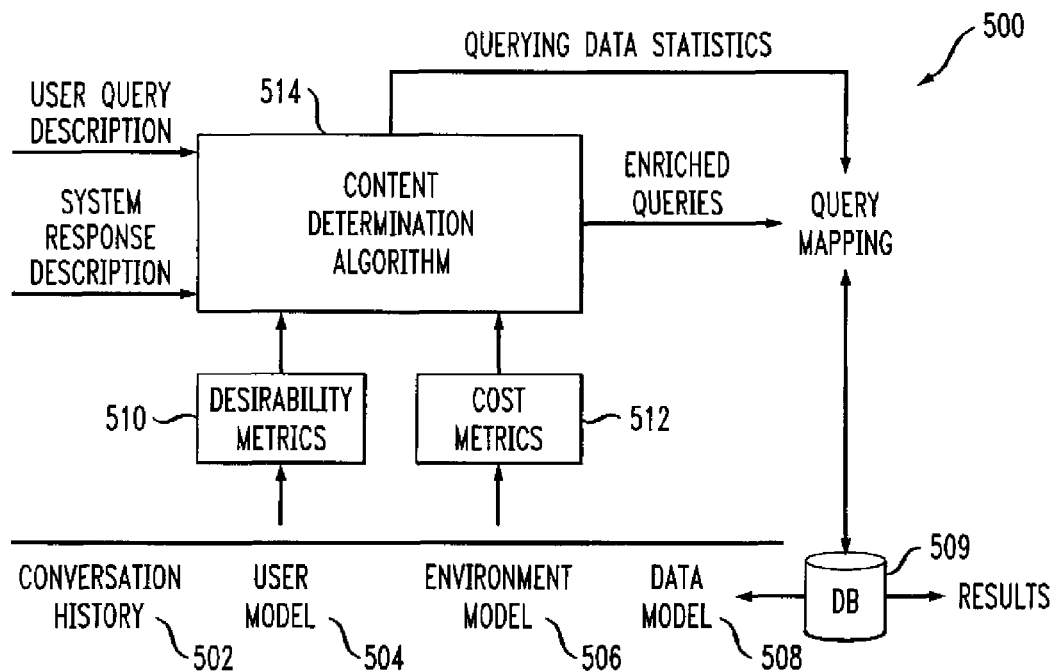
FIG. 5 is a diagram illustrating a content determination framework, according to one embodiment of the present invention.

Referring now to FIG. 5, a diagram illustrates a content determination framework, according to one embodiment of the present invention. The input to framework 500 includes the current user query (e.g., U1 in FIG. 1) and the high-level description of the intended system response (e.g., Show <houses> for U1). The framework exploits various contextual information coming from different sources, including conversation history 502, user model 504, environment model 506, and data model 508. Such contextual information is stored in database 509. To provide the desired extensibility, the framework uses a set of feature-based metrics to model various context-sensitive selection constraints. Specifically, these metrics dynamically measure the presentation desirability (510) and cost (512) of data content.

Moreover, the framework uses an optimization-based algorithm 514 that uses these metrics to select content such that its overall desirability is maximized and the total cost is within a given presentation budget. As described above, the content determination module (which executes algorithm 514) may formulate and submit additional queries to obtain useful information. For example, it may "query data statistics" to know how much data is going to be retrieved. Moreover, it may "enrich user queries" to obtain additional information. For example, to answer a user's request "show houses near train stations," algorithm 514 may formulate two queries: one to retrieve the desired houses, the other to retrieve the related train stations to help establish the context for the user. Note that the queries formulated by algorithm 514 may not be understood by a database directly. If this is a case, then "query mapping" may need to be performed to convert the queries made by algorithm 514 to the underlying database queries.

We now provide example embodiments of implemented context representation.

Data Model

Figure 6:
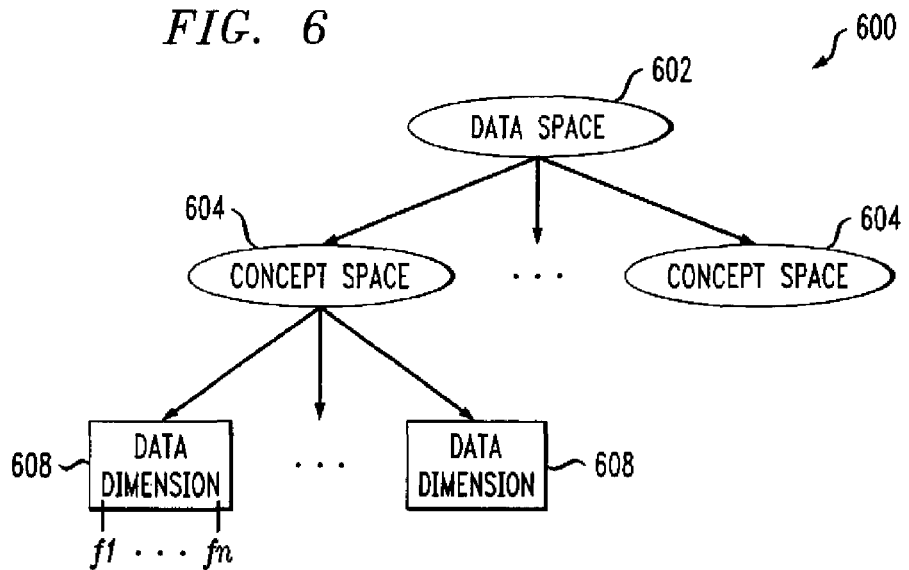
FIG. 6 is a diagram illustrating a data model representation, according to one embodiment of the present invention.

Referring now to FIG. 6, a diagram illustrates a data model representation 600, according to one embodiment of the present invention. As shown, each model is a data space 602, which is made up of concept spaces 604. For example, a real-estate data space includes concepts, such as house, city, and school, while a travel application space may contain concepts, such as flight, hotel, and rental car. A concept space contains a set of data dimensions 608, each of which describes a specific aspect of the concept. For example, a house space contains data dimensions, such as price and style, and a city space has dimensions, including name and population. Each dimension is characterized by a set of features $f1, \ldots, fn$, which describe the semantic properties (e.g., price is an attribute of house) and meta properties (e.g., price is quantitative data) of the dimension.

Features such as data availability and importance could be used to characterize a data dimension from its presentation desirability and cost perspective. For the sake of extensibility and accuracy, we elect to use features that can be dynamically evaluated in context (e.g., data availability per query versus per database). The table in FIG. 12 lists a set of sample features that can be used to model the presentation-related properties of each data dimension.

Environment Model

To tailor a response to a particular application environment, the example embodiment models two media-related properties: media availability and presentation budget. For example, space budget counts the usable screen space in pixels, and time budget limits the maximal time (in seconds) during which a spoken output can last. These values could be obtained using different methods, for example, by querying the device or from empirical study results (e.g., setting the time to 15 seconds to avoid overload of the working memory of a user).

User Query

A query representation captures the data to be retrieved. An example embodiment of a query representation uses a 5-tuple:

Query=<T, F, C, D, S>. Conjunctive queries, such as "show houses and cities", can always be decomposed into queries concerning a single main concept at a time.

Here T represents the user task; F indicates whether it is a new query or a follow-up; C and D denote the data concept (e.g., house) and dimensions (e.g., price and style) to be queried; and S is a set of constraints that the retrieved data must satisfy (e.g., houses under $500,000). An example embodiment of a constraint representation uses a 4-tuple:

Constraint=<Dc, relOp, V, St>.

Here Dc is the constrained data dimension (e.g., price), relOp is the relation operator (e.g., equality operator==), V is the constrained value (e.g., $500,000), and St indicates the status of the constraint: new (formed in the current query, e.g., "just colonials") or inherited (from previous queries, e.g., "show houses under $500K").

User Model

A user can be modeled from multiple aspects. An example embodiment of a user model captures two aspects of a user: the knowledge of the user and the interests of the user. In particular, this model captures knowledge/interests of a user of a domain as a union of data factors. Here a data factor, containing a sub-set of data dimensions, describes a collective aspect of a concept. For example, the house financial factor includes two dimensions: price and tax. Such information regarding knowledge/interests of a user could be acquired using different methods, for example, asking users to fill out a form-based questionnaire when the user logs in.

Conversation History

A conversation history records the detailed exchanges between a user and the system. Abstractly, each exchange consists of a user act (e.g., a query or a reply) and the corresponding system act (e.g., a direct reply or a follow-on question). Each act could be further represented to capture the content of the queries or responses.

Figure 7:
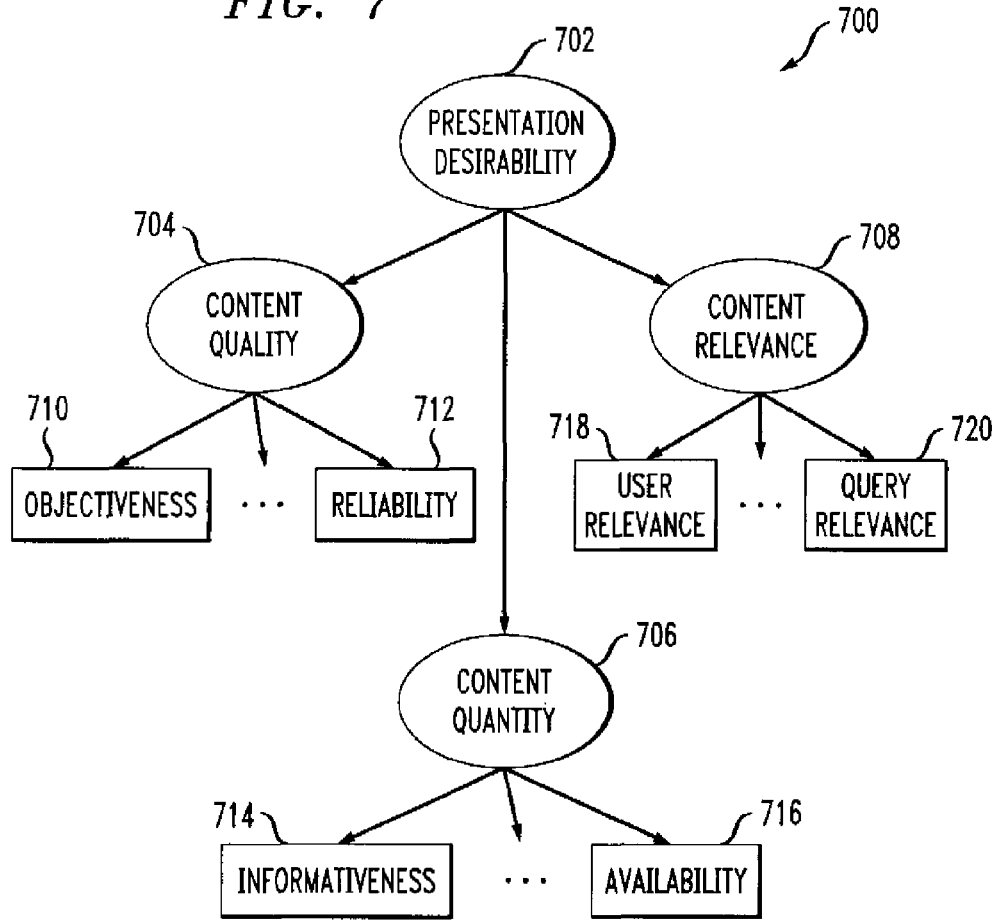
FIG. 7 is a diagram illustrating a process for modeling a presentation desirability metric of a data dimension, according to one embodiment of the present invention.

Referring now to FIG. 7, a diagram illustrates a process 700 for modeling a presentation desirability metric of a data dimension, according to one embodiment of the present invention. This hierarchical model first measures the presentation desirability 702 using three Gricean information presentation aspects (see, e.g., P. Grice, "Logic and Conversation" in P. Cole and J. Morgan, editors, Syntax and Semantics 3: Speech Acts, pages 41-58. Academic Press, 1975, the disclosure of which is incorporated by reference herein): content quality 704, content quantity 706, and content relevance 708. The total desirability is a function of these three metrics (e.g., a weighted sum of all the three). Each Gricean aspect is then modeled as a function of a set of relevant features. An example embodiment of such a function is a weighted sum of a set of relevant feature values. For example, the content quality is a weighted sum of feature values, such as information objectiveness 710 and reliability 712; the content quantity is a weighted sum of feature values, such as informativeness 714 and availability 716; and the content relevance is a weighted sum of feature values, such as user relevance 718 and query relevance 720. The table in FIG. 12 provides an example of such features involved.

Figure 8:
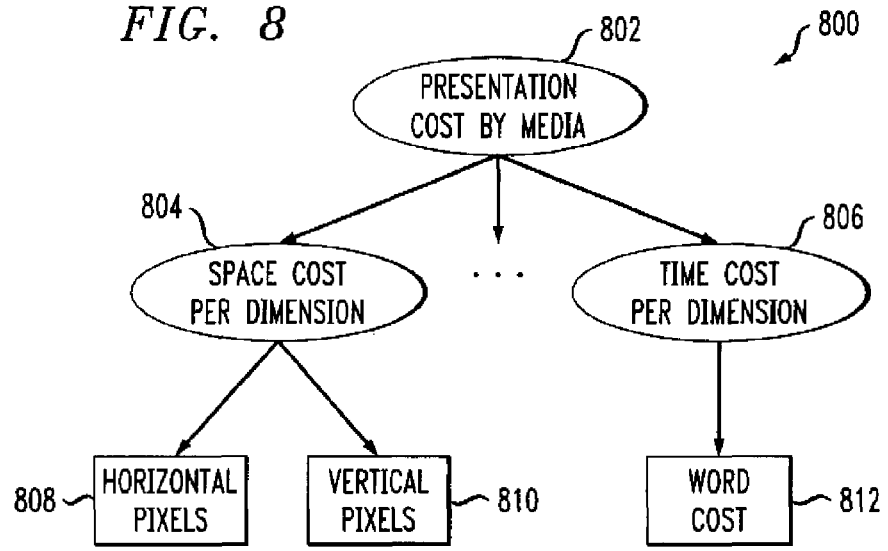
FIG. 8 is a diagram illustrating a process for modeling a cost metric of a data dimension, according to one embodiment of the present invention.

Referring now to FIG. 8, a diagram illustrates a process 800 for modeling a cost metric of a data dimension, according to one embodiment of the present invention. More particularly, FIG. 8 shows an example embodiment for modeling the presentation cost 802 of a data dimension when the dimension is conveyed using a particular medium. For example, the spoken time cost 806 is measured by the word cost 812, the average number of words used for conveying one instance (unit) of data dimension d in speech. For example, the average number of spoken words for describing the style of one house is three. Empirical and statistical experimental results can be used to approximate the word cost for each data dimension. Since the time budget is measured in seconds, the word cost is converted into a time cost:

$$\text{timeCost}(d) = s \times \text{wordCost}(d)/60, \text{ where } s \text{ is the TTS}$$
(Text-to-Speech) speed, at 160 words per minute.

An example embodiment of a method for computing the space cost 804 is to compute the pixels (horizontal pixels 808 and vertical pixels 810) needed to convey one instance of dimension d in text or graphics. For example, the minimal space cost for displaying one house image is 100×100 pixels. Expert-made presentations may be used to estimate the space cost required to depict a dimension (e.g., counting the minimal number of pixels needed to make a text string or an icon recognizable on a desktop).

Note that a computer system may use multiple presentation sources, such as graphics, text, and speech, to present the retrieved data. The presentation cost for each type of source would then need to be considered.

Formula (1-2) is an example embodiment of a method to compute a particular desirability/cost metric for a data dimension d:

$$\text{Desirability}(d) = F(D, Q, U, F, H); \qquad (1)$$

$$\text{Desirability}(d) = v; \text{ where } v \text{ is a constant} \qquad (2)$$

In general, such a metric (e.g., user relevance) is a function, defined over at least one of the following parameters: the data model D, the user model U, the conversation history H, the query Q, and the environment model E. For example, a method to compute the query relevance metric of a data dimension is:

$$R(d, Q) = \text{Avg}[R(d, s_i)], \text{ for all } i]$$

Here $R(d, s_i)$ calculates how relevant dimension d is to constraint $s_i$ in query Q. If d is the constrained dimension in $s_i$, then $R(d, s_i) = t$, $t \in (0, 1)$. We set t based on the constraint status: $t=1$, if $s_i$ is a new constraint, otherwise, t is a time decay factor. Average is a function to compute the average of $R(d, s_i)$.

Different types of measurement functions can be used to define the metric. Similarly, various measurement functions can be defined for each desirability/cost metric.

In addition, the metric or the feature values can also be defined as a constant based on empirical experimental results. For example, the information objectiveness of a data dimension could be obtained by analyzing the data. In the real-estate domain, the dimension of a remark of a seller would be considered less objective than the town location of the house.

Figure 9:
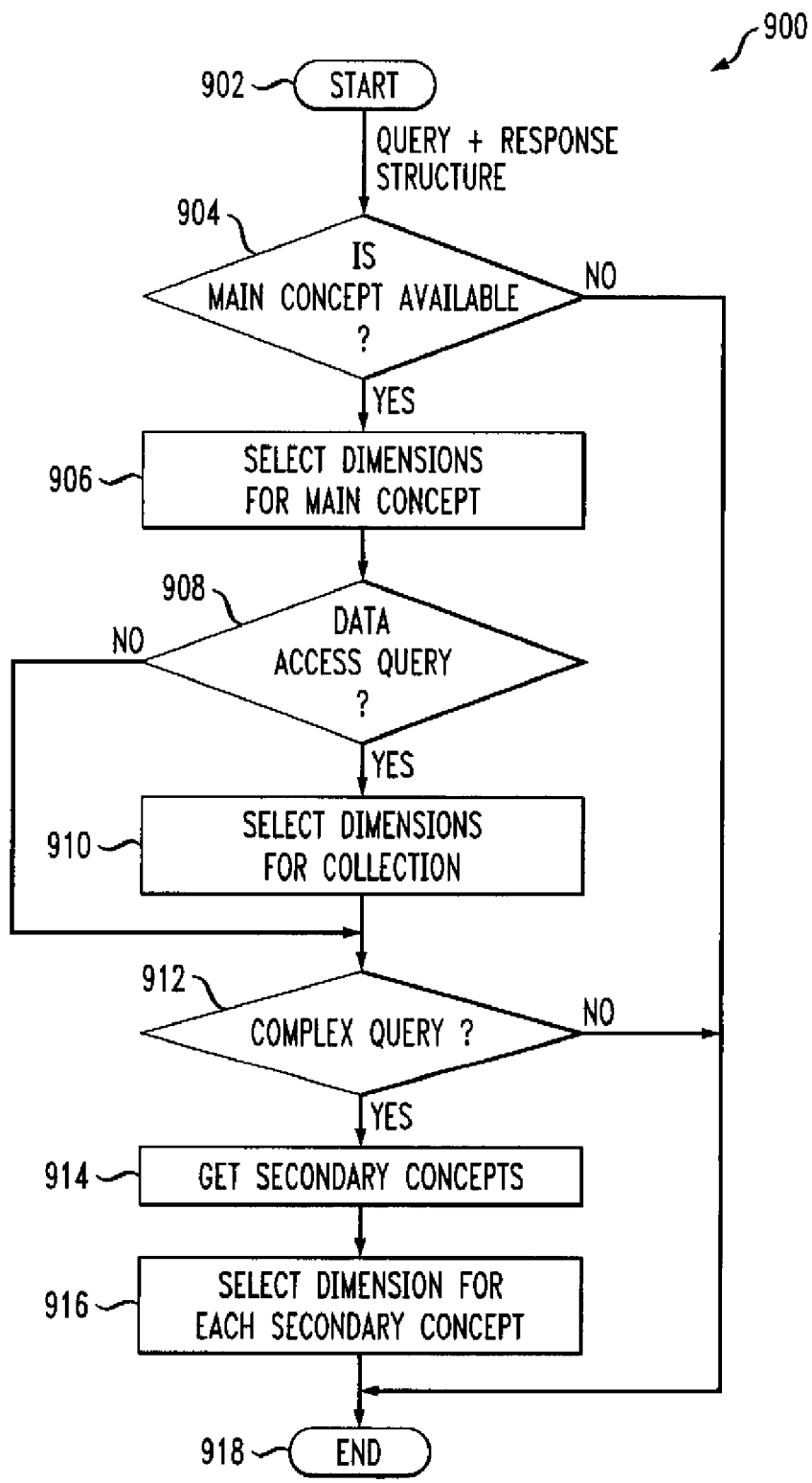
FIG. 9 is a diagram illustrating a methodology for performing content determination, according to one embodiment of the present invention.

Referring now to FIG. 9, a diagram illustrates a methodology for performing content determination, according to one embodiment of the present invention. More particularly, FIG. 9 provides an example embodiment of a method to determine data content dynamically using various types of interaction context information, such as those captured and represented above.

Method 900 starts at block 902 and inputs a partially-defined query representation (e.g., as described above), which may also be augmented with the presentation intention (e.g., summarize the retrieved houses versus describe them). The output of the method is a fully defined query specification, including all relevant data dimensions. First, the method checks whether a main concept (normally marked when query is submitted) is specified (step 904). For example, the main concept in query "Show houses near Phelps hospital" is "house". The method then decides the content in three steps.

First, method 900 selects data dimensions for the main concept being queried (step 906). The dimensions being explicitly requested (e.g., in query "what's the style of this house", dimension style is specified explicitly) are also passed along.

Second, for the purpose of summarizing the retrieved data, the method chooses (step 910) data dimensions for a collection, if the current query is a data access query (step 908). For example, the system may provide the count of retrieved houses.

Third, the method selects dimensions for other concepts being queried (steps 914 and 916), if the current query is a complex query (step 912). A complex query is a query relating multiple concepts. In FIG. 1, U1 links houses (main concept) to hospitals. To provide a coherent presentation, the method attempts to convey information of all related concepts. For example, the method provides the hospital name and location in addition to houses. This situation is addressed last to ensure that there is sufficient budget for conveying the main concept first.

Figure 10:
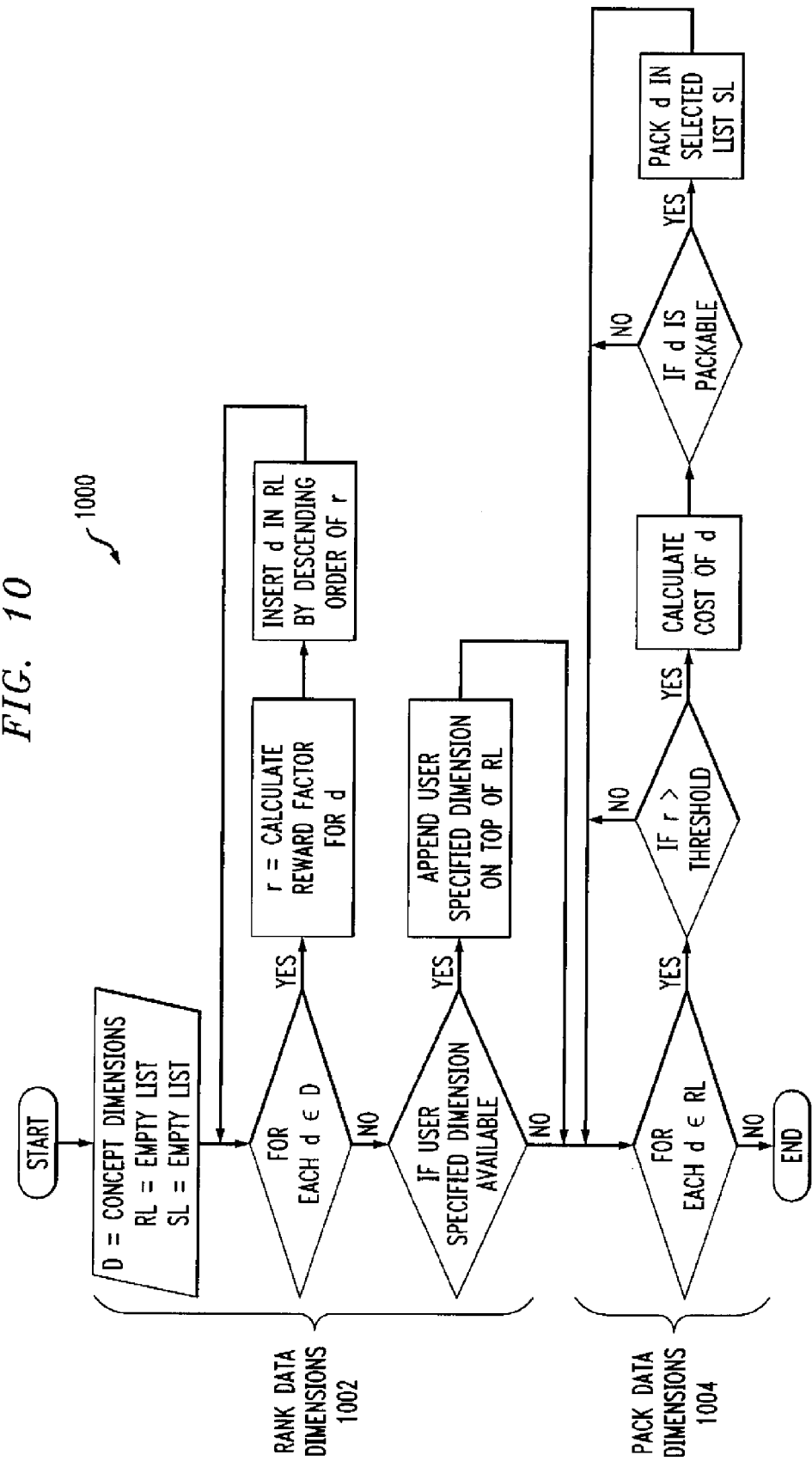
FIG. 10 is a diagram illustrating a methodology for determining data dimensions, according to one embodiment of the present invention.

Referring now to FIG. 10, a diagram illustrates a methodology for determining data dimensions, according to one embodiment of the present invention. More particularly, FIG. 10 describes an example embodiment of a method for selecting data dimensions for a given concept. The objective of this process is to find a subset of data dimensions such that their overall desirability is maximized and the total cost is within given space and time budgets. Since it is an optimization problem, similar to the 0-1 knapsack problem, in this embodiment, a greedy algorithm is used to approximate the process in two steps. A greedy algorithm works here, since most of our data dimensions have similar cost. Otherwise, other approximation methods could be used, such as dynamic programming.

First, method 1000 ranks all dimensions by their total rewards (step 1002). The example embodiment of calculating the total reward is a weighted sum of d's desirability scores by its content quality, quantity, and relevance. If there are user-specified dimensions, they are placed on the top of the ranked list.

Based on the ranked list, method 1000 packs as many dimensions as the budget allows (step 1004). First, it checks whether dimension d has already been selected. It also checks whether the reward is below a certain threshold t (e.g., t=0.35) to avoid selecting undesirable dimensions. If d is not packed, the method calculates the cost of d. Similar to computing the desirability score, the cost involved of presenting a dimension is computed. Depending on which medium is the most effective for conveying d, the corresponding space or time cost is computed. The total cost is the number of retrieved instances (e.g., 12 houses retrieved) multiplying the unit cost of d (e.g., the time cost needed for uttering one instance of house style).

Using the total cost computed above, method 1000 tests whether there is sufficient budget to accommodate the current candidate dimension. If the budget allows, it adds the dimension to the selected list. If one type of budget runs out, the method would examine whether a different medium could present the dimension equally effectively. After a dimension is packed, the available budget is reduced accordingly. The packing stops when all dimensions have been considered.

Figure 11:
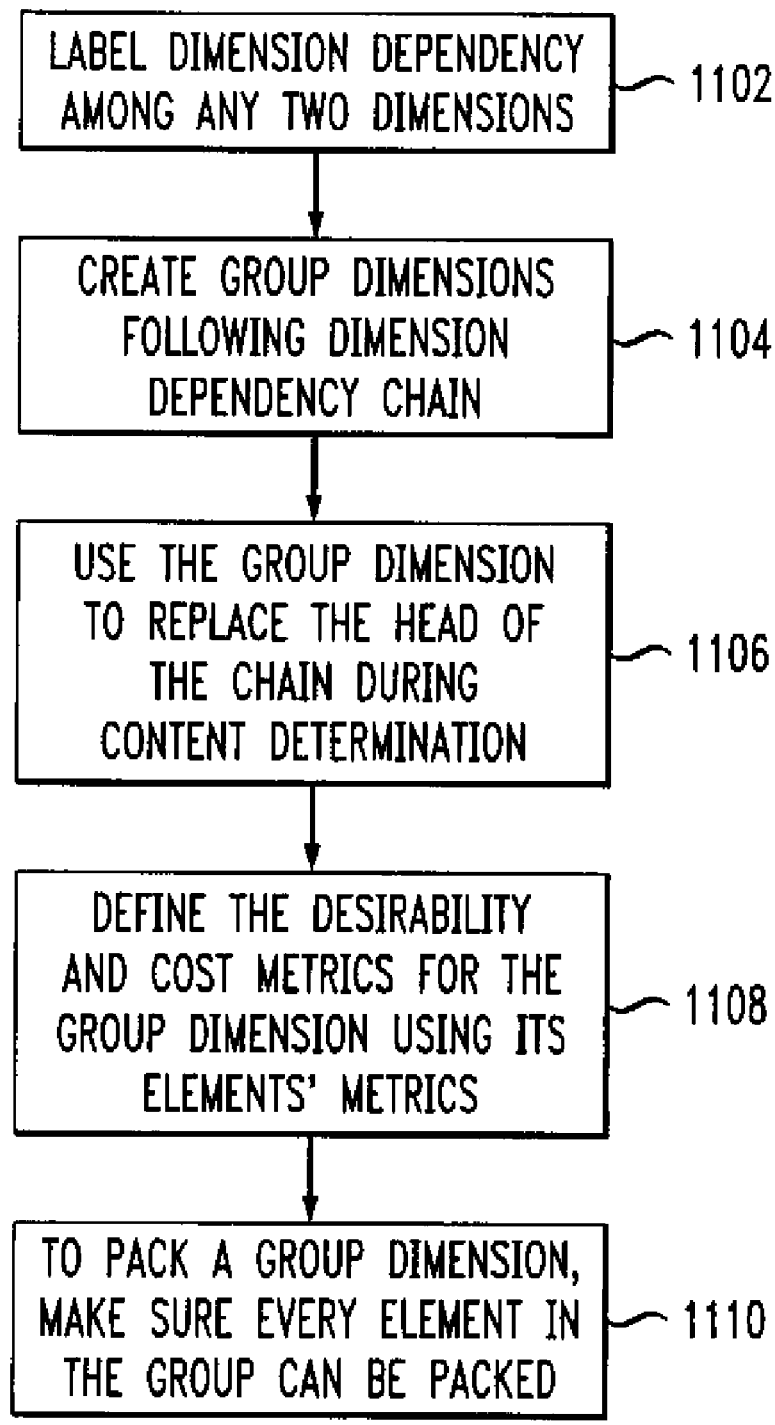
FIG. 11 is a diagram illustrating a methodology for modeling and dealing with inter-dependent data dimensions, according to one embodiment of the present invention.

Referring now to FIG. 11, a diagram illustrates a methodology for modeling and dealing with inter-dependent data dimensions, according to one embodiment of the present invention. For example, dimensions "bedrooms" and "bathrooms" are considered inter-dependent, since they always appear together based on our analysis of real-estate websites, To account for this type of relationship during content determination, method 1100 first labels the dimension dependency (step 1102), between two dimensions in the data model. If dimension A depends on dimension B, and A is selected to be conveyed, then B must be included.

Based on the dimension dependency, the method forms group dimensions (step 1104), which contain a set of dimensions by following a dependency chain. For example, if A depends on B, and B on C, then two group dimensions are formed: group [A, B, C] starting from A and group [B, C] starting from B. During content selection, a group dimension is used to replace the head of the chain (step 1106). In the above example, [A, B, C] and [B, C] replace dimensions A and B, respectively. As a result, a group dimension may appear in content ranking and packing.

To consistently handle a group dimension g and an individual dimension d alike, method 1100 defines the desirability and cost of g (step 1108). One implementation defines g's value for feature $f_i$ as a function G over $f_i$ of all g's members. Different functions G may be defined for different features. For example, G is Max() for computing the importance of g, while G is Avg( ) for measuring the objectiveness of g. Likewise, the cost of g is defined to be the total cost of all its members. To pack a group dimension, there must be enough budget to accommodate all members of the group (step 1110). Using group dimensions, we ensure that all relevant dimensions be selected to produce a coherent view of the requested data.

In addition to the binary dimension dependency, n-ary dimension dependency could also be defined. An example is to model a special dimension, called a parasite dimension, which depends on at least one of the other dimensions. In essence, a parasite dimension cannot be presented alone, and it must be conveyed with at least one of the dimensions that it depends on. For example, an identifier like house MLS is considered a parasite dimension. Proper name identifiers, such as city name and school name, are not modeled as parasite dimensions, since they are considered to provide a shorthand definite description of data entities. Since MLS conveys little information, it is undesirable for the system to provide users with only MLSs of requested houses. On the other hand, without MLSs, users cannot easily refer to the houses that they are interested in (e.g., "tell me more about MLS234076"). A parasite dimension is treated separately during the packing process (FIG. 10). For example, a parasite dimension can be included only if at least one of the dimensions that it depends on has been packed.

Referring lastly to FIG. 13, a diagram illustrates a computer system suitable for implementing an information-seeking system, according to one embodiment of the present invention. For example, the illustrative architecture of FIG. 13 may be used in implementing any and all of the components and/or steps described in the context of FIGS. 1 through 12.

As shown, the computer system 1300 may be implemented in accordance with a processor 1302, a memory 1304, I/O devices 1306, and a network interface 1308, coupled via a computer bus 1310 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also includes techniques for providing data content determination services. By way of example, a service provider agrees (e.g., via a service level agreement or some informal agreement or arrangement) with a service customer or client to provide data content determination services. That is, by way of one example only, the service provider may host the customer's web site and associated applications. Then, in accordance with terms of the contract between the service provider and the service customer, the service provider provides data content determination services that may include one or more of the methodologies of the invention described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of determining data content for a response to a query, comprising the steps of:
   obtaining a user query;
   selecting one or more of a plurality of modalities for outputting a response to the query;
   dynamically determining data content suitable for generating a response to the query, wherein data content determination is modeled as an optimization operation which attempts to balance context-based selection constraints; and
   outputting the response to the query using the selected one or more of the plurality of modalities;
   wherein the data content determination further comprises modeling the context-based selection constraints as feature-based metrics, the feature-based metrics measuring a presentation desirability value and one or more cost values associated with the selected one or more of the plurality of modalities; and
   wherein the selection comprises:
      determining a cost value associated with a visual presentation of at least a portion of the response;
      determining a cost value associated with a spoken presentation of the at least a portion of the response;
      comparing the cost value associated with the visual presentation and the cost value associated with the spoken presentation; and
      selecting at least one of the visual presentation and the spoken presentation based at least in part on the comparison of the cost value associated with the visual presentation and the cost value associated with the spoken presentation.

2. The method of claim 1, wherein the step of the feature-based metrics measuring a presentation desirability value further comprises the step of using one or more data content properties.

3. The method of claim 2, wherein the step of using one or more data content properties further comprises using at least one of data volume, data availability or data informativeness.

4. The method of claim 1, wherein the step of the feature-based metrics measuring a presentation desirability value further comprises the step of using one or more data relationships.

5. The method of claim 4, wherein the step of using one or more data relationships further comprises using a data dependency.

6. The method of claim 1, wherein the step of the feature-based metrics measuring a presentation desirability value further comprises the step of using user infomation.

7. The method of claim 6, wherein the step of using user information further comprises using user interests.

8. The method of claim 1, wherein the step of the feature-based metrics measuring a presentation desirability value further comprises the step of using environment information.

9. The method of claim 8, wherein the step of using environment information further comprises using data associated with at least one of device features and availability.

10. The method of claim 1, wherein the step of the feature-based metrics measuring a presentation desirability value further comprises the step of using a conversation history.

11. The method of claim 10, wherein the step of using a conversation history further comprises using a sequence of previous user queries and system responses.

12. The method of claim 1, wherein the cost value associated with the visual presentation comprises a space cost associated with outputting the at least a portion of the response to the query using the visual presentation, wherein the space cost is based at least in part on a number of pixels required to output the at least a portion of the response to the query using the visual presentation.

13. The method of claim 1, wherein the cost value associated with the spoken presentation comprises a time cost associated with outputting the at least a portion of the response to the query using the spoken presentation.

14. The method of claim 1, wherein the step of dynamically determining data content further comprises the step of formulating the feature-based metrics using contextual information.

15. The method of claim 14, wherein the step of the feature-based metrics using contextual information further comprises the contextual information comprising at least one of query information, a conversation history, and a user model.

16. The method of claim 1, wherein the step of dynamically determining data content further comprises the step of performing the optimization operation such that one or more desirability metrics are maximized and one or more cost metrics are minimized.

17. Apparatus for determining data content for a response to a query, comprising:
a memory; and
at least one processor coupled to the memory and operative to obtain a user query; to select one or more of a plurality of modalities for outputting a response to the query; to dynamically determine data content suitable for generating a response to the query, wherein data content determination is modeled as an optimization operation which attempts to balance context-based selection constraints; and to output the response to the query using the selected one or more of the plurality of modalities;
wherein the data content determination further comprises modeling the context-based selection constraints as feature-based metrics, the feature-based metrics measuring a presentation desirability value and one or more cost values associated with the selected one or more of the plurality of modalities; and
wherein the selection comprises:
determining a cost value associated with a visual presentation of at least a portion of the response;
determining a cost value associated with a spoken presentation of the at least a portion of the response;
comparing the cost value associated with the visual presentation and the cost value associated with the spoken presentation; and
selecting at least one of the visual presentation and the spoken presentation based at least in part on the comparison of the cost value associated with the visual presentation and the cost value associated with the spoken presentation.

18. An article of manufacture for determining data content for a response to a query, comprising a machine readable medium containing one or more programs which when executed implement the steps of:
obtaining a user query;
selecting one or more of a plurality of modalities for outputting a response to the query;
dynamically determining data content suitable for generating a response to the query, wherein data content determination is modeled as an optimization operation which attempts to balance context-based selection constraints; and
outputting the response to the query using the selected one or more of the plurality of modalities;
wherein the data content determination further comprises modeling the context-based selection constraints as feature-based metrics, the feature-based metrics measuring a presentation desirability value and one or more cost values associated with the selected one or more of the plurality of modalities; and
wherein the selection comprises:
determining a cost value associated with a visual presentation of at least a portion of the response;
determining a cost value associated with a spoken presentation of the at least a portion of the response;
comparing the cost value associated with the visual presentation and the cost value associated with the spoken presentation; and
selecting at least one of the visual presentation and the spoken presentation based at least in part on the comparison of the cost value associated with the visual presentation and the cost value associated with the spoken presentation.

19. A method of providing a service for determining data content for a response to a query, comprising the step of:
a service provider, in response to an obtained query, enabling the steps of:
selecting one or more of a plurality of modalities for outputting a response to the query;
dynamically determining data content suitable for generating a response to the query, wherein data content determination is modeled as an optimization operation which attempts to balance context-based selection constraints; and
outputting the response to the query using the selected one or more of the plurality of modalities;
wherein the data content determination further comprises modeling the context-based selection constraints as feature-based metrics, the feature-based metrics measuring a presentation desirability value and one or more cost values associated with the selected one or more of the plurality of modalities; and
wherein the selection comprises:
determining a cost associated with a visual presentation of at least a portion of the response;
determining a cost associated with a spoken presentation of the at least a portion of the response;
comparing the cost associated with the visual presentation and the cost associated with the spoken presentation; and
selecting at least one of the visual presentation and the spoken presentation based at least in part on the comparison of the cost associated with the visual presentation and the cost associated with the spoken presentation.

20. The method of claim 13, wherein the time cost is based at least in part on a number of words in the at least a portion of the response.

* * * * *